(12) United States Patent
Dimovski et al.

(10) Patent No.: US 10,118,512 B2
(45) Date of Patent: Nov. 6, 2018

(54) ADJUSTABLE HEAD RESTRAINT

(71) Applicant: ADIENT LUXEMBOURG HOLDING S.A.R.L., Luxembourg (LU)

(72) Inventors: Dalibor Dimovski, Macomb, MI (US); Kenneth Clark, Rogersville, MO (US); Steve Clark, Highland, MI (US); Emery Jay Zadina, Ypsilanti, MI (US); Alan Boyko, Novi, MI (US); David Hayes, West Bloomfield, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 0 days.

(21) Appl. No.: 15/504,762

(22) PCT Filed: Aug. 17, 2015

(86) PCT No.: PCT/US2015/045493
§ 371 (c)(1),
(2) Date: Feb. 17, 2017

(87) PCT Pub. No.: WO2016/028677
PCT Pub. Date: Feb. 25, 2016

(65) Prior Publication Data
US 2017/0267136 A1     Sep. 21, 2017

Related U.S. Application Data

(60) Provisional application No. 62/038,503, filed on Aug. 18, 2014.

(51) Int. Cl.
*B60N 2/42* (2006.01)
*B60N 2/879* (2018.01)
(Continued)

(52) U.S. Cl.
CPC ............... *B60N 2/42* (2013.01); *B60N 2/806* (2018.02); *B60N 2/829* (2018.02); *B60N 2/879* (2018.02);
(Continued)

(58) Field of Classification Search
CPC ...... B60N 2/4829; B60N 2/42; B60N 2/4876; B60N 2/879; B60N 2002/899; B60Q 3/233
(Continued)

(56) References Cited

U.S. PATENT DOCUMENTS 3,218,103 A * 11/1965 Boyce ..................... B60R 21/16
                                                    128/DIG. 20
3,525,535 A     8/1970 Yasusaburo
(Continued)

FOREIGN PATENT DOCUMENTS

DE     102009013942     *  9/2010  ............... B60Q 3/64
EP     1 325 837 A1        7/2003
GB     1 452 534 A        10/1976

OTHER PUBLICATIONS

International Preliminary Report on Patentability in International Application No. PCT/US2015/045493 dated Mar. 2, 2017, 7 pages.
(Continued)

*Primary Examiner* — Milton Nelson, Jr.
(74) *Attorney, Agent, or Firm* — Foley & Lardner LLP

(57) ABSTRACT

A head restraint may include a support structure with an opening, adjustable flexible elongated members, and an adjustment mechanism. The elongated members may be attached to the support structure, may span the opening in the support structure, and may be configured to support a user's head. The adjustment mechanism may be configured
(Continued)

to at least one of automatically and/or manually adjust tension of at least portions of the elongated members spanning the opening.

14 Claims, 13 Drawing Sheets

(51) Int. Cl.
    *B60Q 3/233*     (2017.01)
    *B60N 2/806*     (2018.01)
    *B60N 2/829*     (2018.01)
    *B60N 2/80*     (2018.01)

(52) U.S. Cl.
    CPC ........ *B60Q 3/233* (2017.02); *B60N 2002/899* (2018.02); *B60N 2205/30* (2013.01)

(58) Field of Classification Search
    USPC ...... 297/284.2, 391, 216.12, 452.64, 452.63, 297/393
    See application file for complete search history.

(56) References Cited

U.S. PATENT DOCUMENTS

| | | | | | |
|---|---|---|---|---|---|
| 4,182,322 | A | * | 1/1980 | Miller | ................. A61F 5/05883 5/637 |
| 5,306,232 | A | * | 4/1994 | Whitmyer | ............. A61F 5/3707 482/10 |
| 6,056,367 | A | * | 5/2000 | Hsiao | ..................... A47C 7/024 297/452.63 |
| 2002/0067031 | A1 | * | 6/2002 | Busgen | ................... B60R 21/18 280/733 |
| 2003/0042783 | A1 | | 3/2003 | Potes et al. | |
| 2004/0195894 | A1 | | 10/2004 | Pal et al. | |
| 2008/0100116 | A1 | | 5/2008 | Orzelski | |

OTHER PUBLICATIONS

International Search Report and Written Opinion of the International Searching Authority in corresponding International Application No. PCT/US2015/045493 dated Oct. 27, 2015, 9 pages.
Office Action dated Sep. 4, 2018, received in corresponding Chinese application No. 201580053041.X, 6 pages.

* cited by examiner

ADJUSTABLE HEAD RESTRAINT

CROSS-REFERENCE TO RELATED PATENT APPLICATIONS

The present application is a U.S. National Stage of International Application No. PCT/US2015/045493 filed on Aug. 17, 2015, which claims the benefit of U.S. Provisional Patent Application No. 62/038,503 filed on Aug. 18, 2014, the entire disclosures of all of which are incorporated herein by reference.

FIELD

The disclosure relates generally to head restraints.

BACKGROUND

Due to the safety requirements, constraints, and regulations for head restraints within vehicles as well as the current designs and manufacturing methods, current head restraints are larger and more bulky than desirable. The bulky size of current head restraints may be both intrusive and uncomfortable for the occupant as well as limit the amount of available room for the occupants within the vehicle and reduce the amount of visibility the driver has.

SUMMARY

A head restraint may include a support structure with an opening, adjustable flexible elongated members, and an adjustment mechanism. The elongated members may be attached to the support structure, may span the opening in the support structure, and may be configured to support a user's head. The adjustment mechanism may be configured to at least one of automatically and/or manually adjust tension of at least portions of the elongated members spanning the opening.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features, aspects, and advantages of the present invention will become apparent from the following description and the accompanying exemplary embodiments shown in the drawings, which are briefly described below.

DETAILED DESCRIPTION

Referring generally to the figures, disclosed herein is a head restraint, as shown according to exemplary embodiments, which may be used to properly support the head of an occupant in the event of an accident (according to vehicle safety requirements), while improving occupant comfort and minimizing the size of the head restraint (e.g., enabling a thinner package). The head restraint and methods described herein may be used in a variety of applications and movable devices that previously utilized a conventional head restraint. The head restraint may also be useful in any non-vehicle application when it would be desirable to have an adjustable head restraint. In one exemplary embodiment, the head restraint may utilize adjustable elongated members (e.g., cords or straps). During normal driving conditions, the tension of the elongated members may be adjusted according to the desired tension for occupant comfort. In the event of a vehicle collision, the tension of the elongated members may be automatically adjusted in order to provide proper head support.

Figure 1:
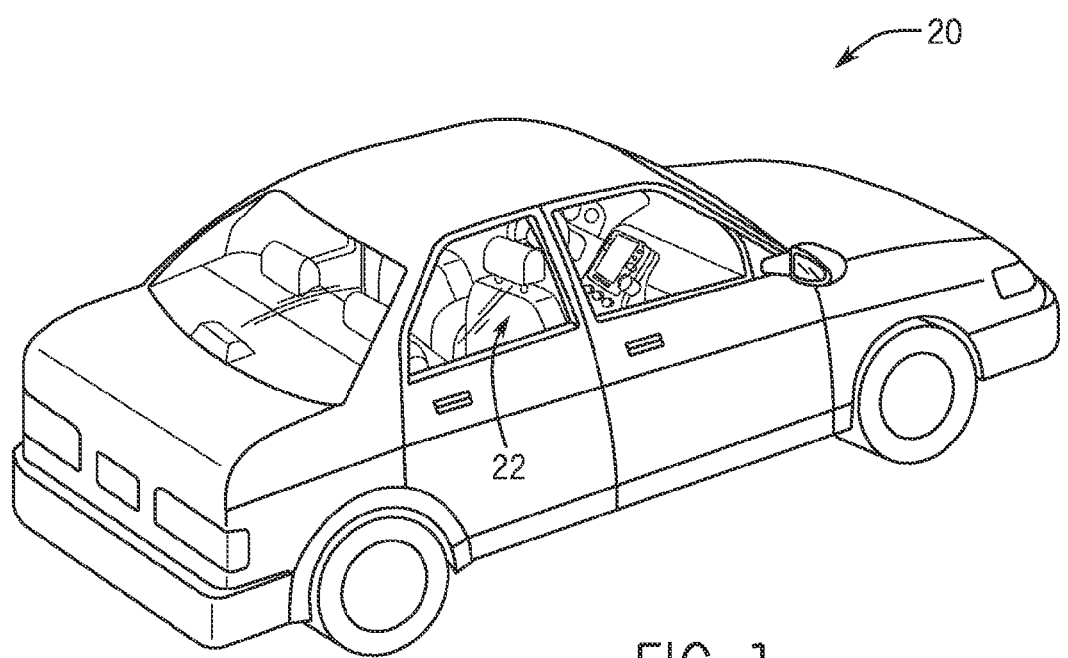
FIG. 1 is a perspective view of a vehicle according to one embodiment of the present invention.

FIG. 1 illustrates an exemplary embodiment of a vehicle 20 with an automotive or vehicle seat 22 that may include the head restraint described herein. The vehicle 20 may include an interior passenger compartment containing a vehicle seat 22 for providing seating to an occupant. Although a four door sedan automobile is shown in FIG. 1, the head restraint may be used in a variety of applications, but is particularly useful with seats in any type of vehicle, such as a two door or four door automobile, a truck, a SUV, a van, a train, a boat, an airplane, or other suitable vehicular conveyance. Even more preferably, multiple head restraints described herein may be disposed on multiple different seats within the vehicle 20 to provide head support to multiple passengers within the vehicle 20.

Figure 2:
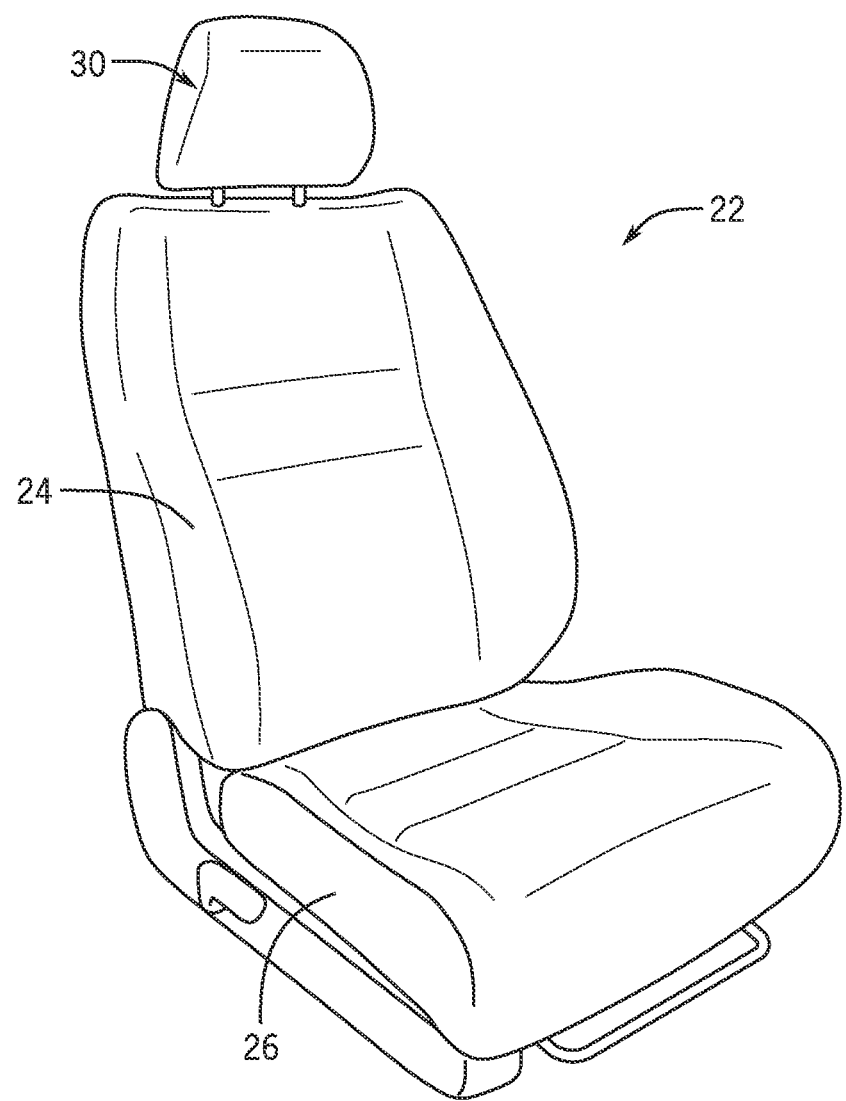
FIG. 2 is a perspective view of a vehicle seat that can be disposed in the vehicle of FIG. 1.

According to one embodiment of the present invention as depicted in FIG. 2, the vehicle seat 22 includes a seating assembly which may comprise a variety of components. For example, the seating assembly may include a seat back 24 and a seat bottom or cushion 26. The seat back 24 and the seat cushion 26 may useful for supporting the body of occupant of the seat 22. The vehicle seat 22 (as well as the seating assembly) may additionally include a head restraint or head rest 30, which may be used to provide support to the head of a passenger. As shown in FIG. 2, the head rest 30 may be attached to a top portion of the seat back 24.

Figure 3A:
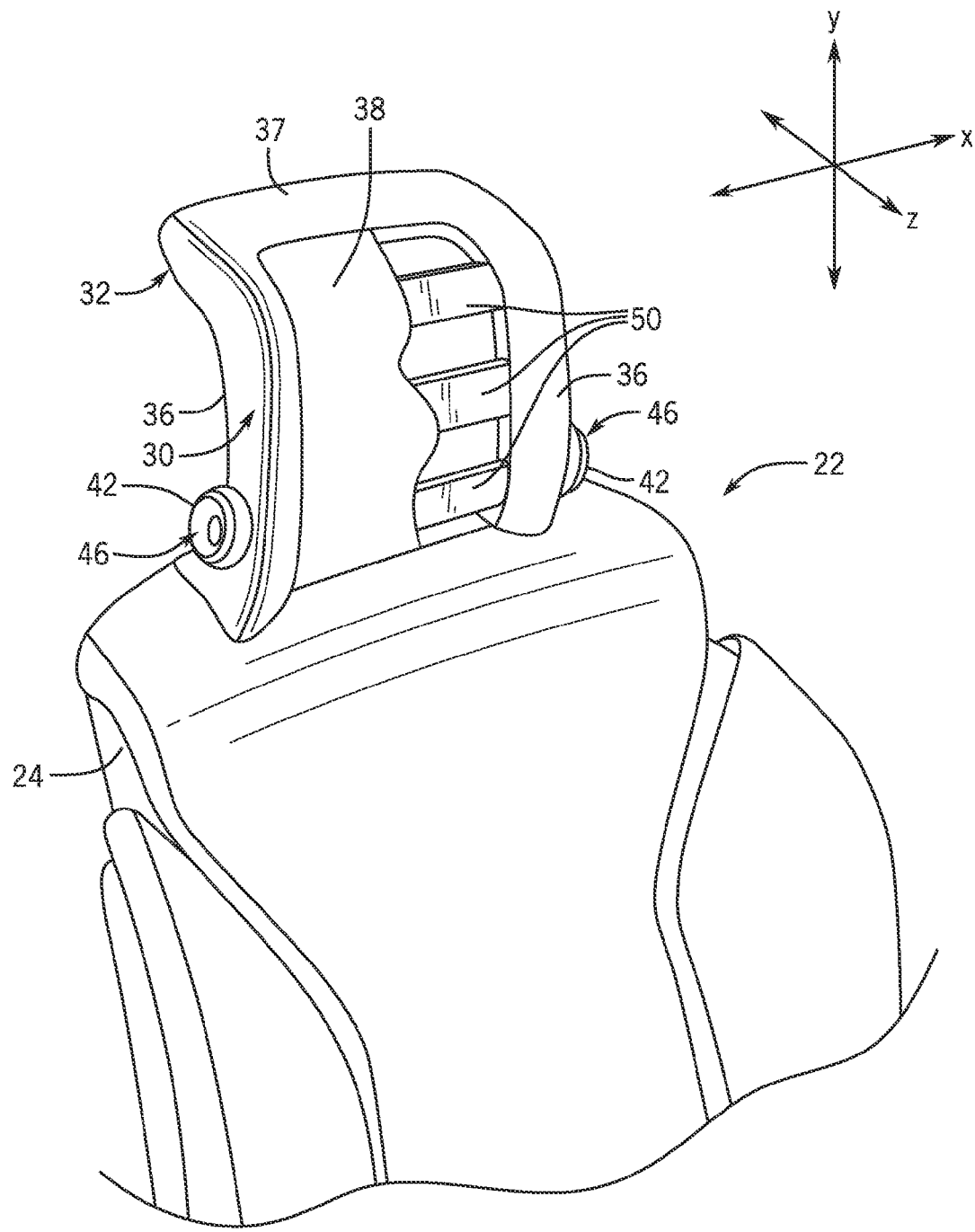
FIG. 3A is a perspective, partially cut-away, front view of a vehicle seat with a head rest according to another embodiment that can be disposed in the vehicle of FIG. 1.
Figure 3B:
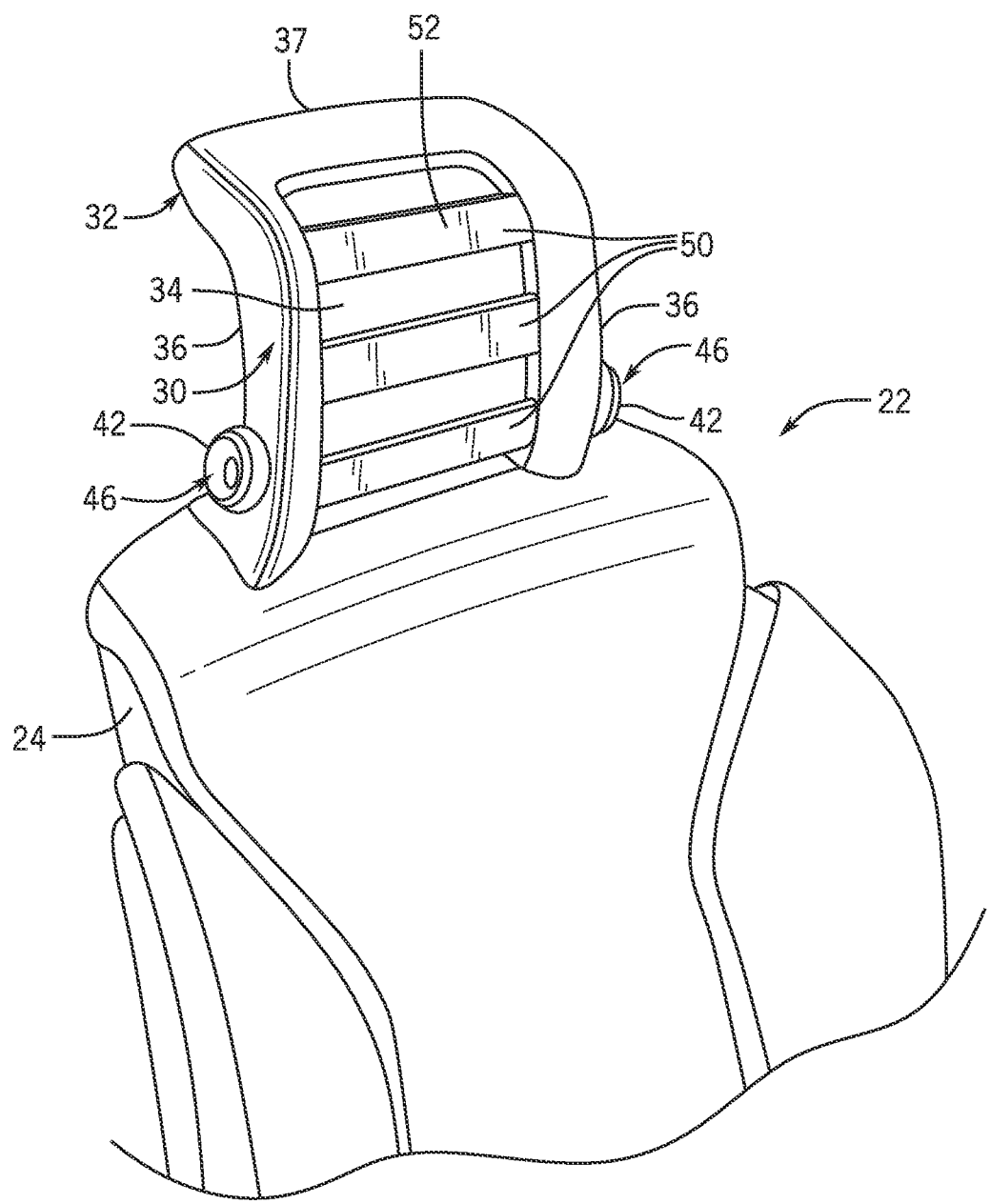
FIG. 3B is a perspective view of the vehicle seat of FIG. 3A with a head rest without trim.

Referring now to FIGS. 3A-3B, there is shown one embodiment of the head rest 30, which may be located on top of the vehicle seat 22. The head rest 30 may include a support structure 32 attached to the vehicle seat 22, adjustable flexible elongated members 50 attached to the support structure 32, and an adjustment mechanism 40 to adjust the tension of the elongated members 50.

The Support Structure

Figure 8:
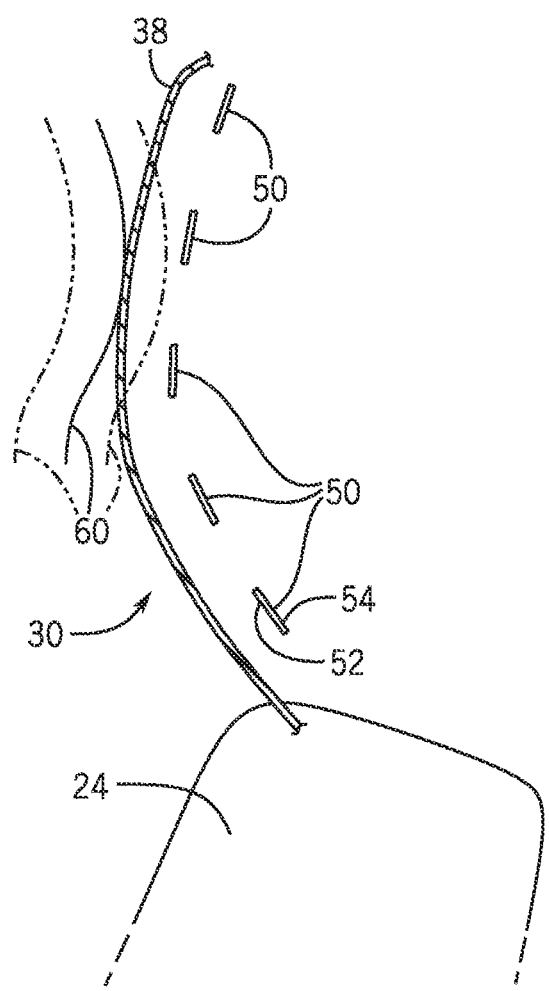
FIG. 8 is a cross-sectional, side view of a vehicle seat with a head rest according to still another embodiment.

The sub-structure or support structure 32 of the head rest 30 may be sufficiently strong in order to support the elongated members 50 (and thus also the head 60 of the occupant) in any configuration, scheme, arrangement, or mode (e.g., the comfort mode 72 or the collision mode 74) of the head rest 30. As shown in FIG. 8, the support structure 32 may directly connect with (and extend at least partially into and out from) the seat back 24. As shown in FIG. 3A, the support structure 32 may extend around at least a portion of the head rest 30. Optionally, the support structure 32 may allow the height of the head rest 30 to be vertically adjustable relative to the seat back 24 according to occupant preference. In order to maintain the thin or minimal size of the head rest 30, the support structure 32 may be minimized or slim.

Figure 5A:
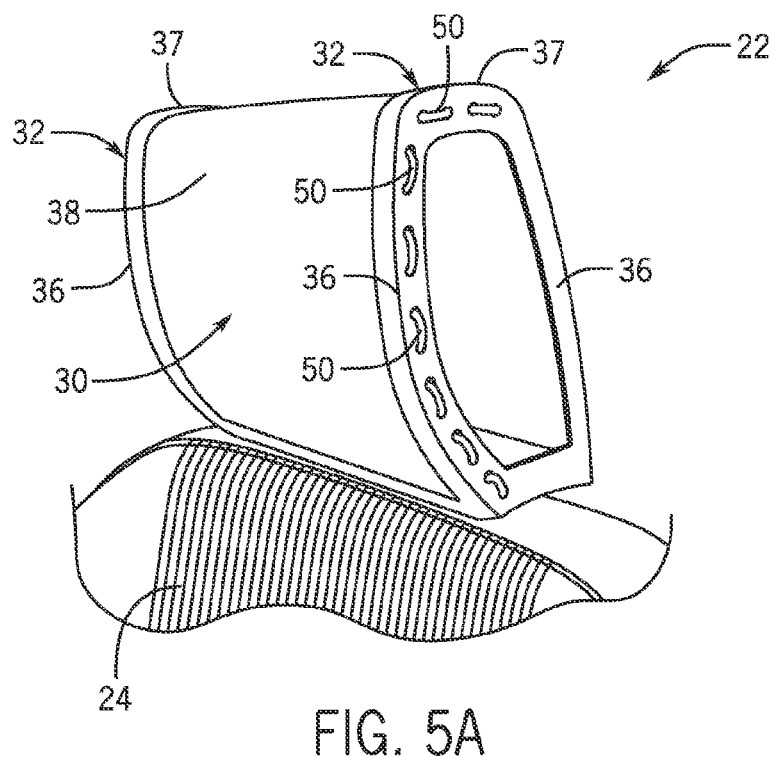
FIGS. 5A and 5B are perspective and side views of a vehicle seat with a head rest according to another embodiment.
Figure 5B:
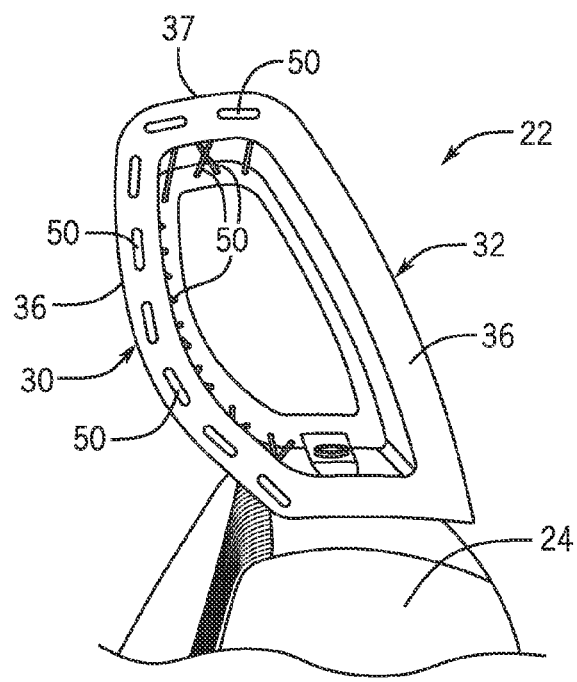
Figure 9:
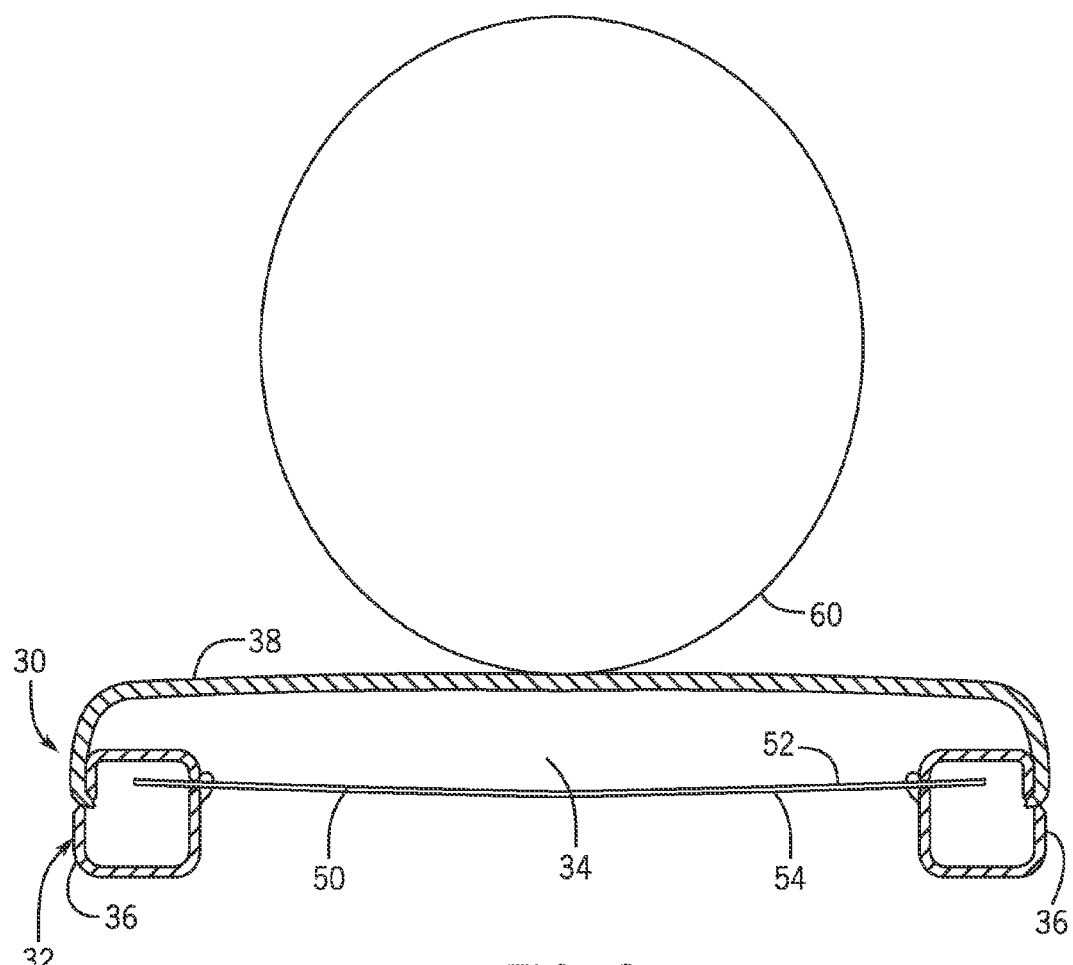
FIG. 9 is a cross-sectional, top view of the head rest of FIG. 8.

According to an exemplary embodiment, the support structure 32 may be located on and/or extend between opposite sides of the head rest 30. For example, the support structure 32 may include two substantially vertical and opposing side portions 36 extending along either side of the head rest 30 from the seat back 24 in approximately a vertical direction (e.g. along the y-axis, as shown in FIG. 3A). The side portions 36 may be on either side of the occupant's head 60 when in use, as shown in FIG. 9. As shown in FIGS. 5A-5B, the side portions 36 may optionally extend from the front of the head rest 30 to the back of the head rest 30 with a gap, space, or opening therebetween.

Figure 6:
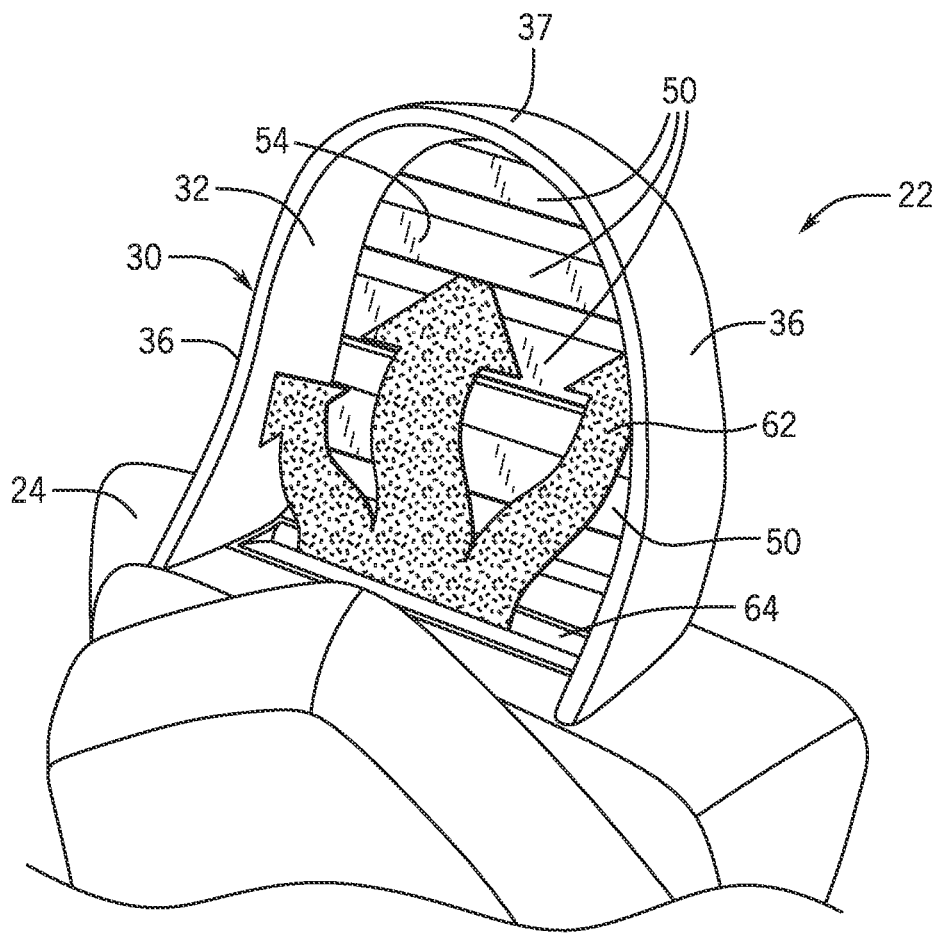
FIG. 6 is perspective back view of a vehicle seat with a head rest according to another embodiment.

The support structure 32 may additionally include at least one substantially horizontal top portion 37 (e.g. along the x-axis). According to one embodiment as shown in FIGS. 3A-3B, the top portion 37 may connect the two side portions 36 (on either side of the head 60 of the occupant) of the support structure 32. According to another embodiment as shown in FIG. 6, the top portion 37 may connect the two side portions 36 by curving around the top of the head rest 30 from side to side. According to yet another embodiment as shown in FIGS. 5A and 5B, the top portion 37 may connect a front portion and a back portion of each of the side portions 36 by curving around the top of the head rest 30 from the front to back (e.g. along the z-direction) and thus the head rest 30 may have a cross-section that is circular, oblong, rectangular, oval, cylindrical, etc. An additional support may optionally connect the two side portions 36.

The support structure 32 may include an aperture or opening 34. For example, the side portions 36 of the support structure 32 (and, optionally, the top portion 37) may define the opening 34. The opening 34 may correspond to a region that directly supports the occupant's head 60. As described further herein, the elongated members 50 may extend along the opening 34 between the side portions 36 of the support structure 32.

The support structure 32 may be constructed out of a variety of materials, including but not limited to plastic, metal, or wood.

The Elongated Members

As shown in FIG. 3B, the head rest 30 may further include adjustable flexible cords, straps, or elongated members 50 that are configured to support a user's or occupant's head 60 in a variety of circumstances or modes. Accordingly, the elongated members 50 may be attached to at least a portion of the support structure 32 and may span across the opening 34 in the support structure 32 to provide a support area for the occupant's head 60. As described further herein, the tension of the elongated members 50 between the sides portions 36 of the support structure 32 may be automatically and/or manually adjusted by an adjustment mechanism 40. The elongated members 50 may minimize the obtrusiveness of the head rest 30 and maximize the amount of visibility the occupants have.

As shown in FIG. 3B-8, the elongated members 50 may attach to and extend between the two side portions 36 of the support structure 32. The elongated members 50 may be oriented and configured according to the desired configuration and use. For example, according to an exemplary embodiment, the elongated members 50 may be substantially horizontal (e.g. parallel to the x-axis in FIG. 3A). According to another embodiment, the elongated members 50 may be configured in multiple directions (e.g. in a crisscross or mesh pattern). However, it is anticipated that the elongated members 50 may be vertical, angled, and/or diagonal.

The elongated members 50 may attach intermittently to the sides of the support structure 32 along the vertical direction of the support structure 32 and may optionally have gaps or spaces between the elongated members 50. The spaces between the elongated members 50 may vary according to the desired amount of support and the width of the elongated members 50. For example, there may a visible gap between the elongated members 50, the elongated members 50 may be flush with one another, or the elongated members 50 may overlap with one another.

The elongated members 50 may be shaped and sized according to the desired configuration and use. As shown in FIGS. 3A-3B and 6, the elongated members 50 may be substantially flat (or thin along the z-axis) and relatively wide (along the y-axis). However, it is anticipated that the elongated members 50 may have other shapes, such as round, thick (e.g. along the z-axis), and/or thin (along the y-axis).

According to the desired configuration, comfort, and aesthetic look, the elongated members 50 may optionally be covered along at least one side by a trim 38, which may correspond with or match the interior of the vehicle 20 (e.g., the elongated members 50 may be beneath the trim 38, as shown in FIGS. 3A and 8-9). As shown in FIG. 9, both the trim 38 and the elongated members 50 may attach to and connect into the support structure 32.

According to one embodiment as shown in FIGS. 3A, 8, and 9, the trim 38 may located along, extend along, or cover a front side 52 of the elongated members 50 (and thus the front of the head rest 30) such that the occupant's head 60 may directly rest on the trim 38 and may be supported by the elongated members 50 beneath the trim 38. For example, the elongated members 50 are located underneath the trim 38 when viewed from the front of the seat 22. According to another embodiment as shown in FIGS. 5A and 5B, the trim 38 maybe located along the front as well as the back of the head rest 30. However, it is anticipated that the trim 38 may be located along any combination of the front, sides, and/or back of the head rest 30.

As shown in FIGS. 8-9, the head 60 of the occupant may rest directly against or abut the trim 38. The trim 38 may be spaced from the elongated members 50 or may be flush against the elongated members 50. As the occupant leans their head 60 into the head rest 30 (for support or comfort, or in the event of a collision), the head 60 may be supported by the elongated members 50 through the trim 38. Accordingly, the compliance of the trim 38 may optionally be directly affected by the current tension of the elongated members 50 (even though the elongated members 50 may be located underneath or behind the trim 38).

Alternatively or additionally, a piece, layer, or sheet of foam may be positioned between the trim 38 and the elongated members 50 for additional comfort. Foam may also be located behind the elongated members 50 or head rest 30 for the backseat occupants and/or for the overall look of the vehicle 20.

Figure 11:
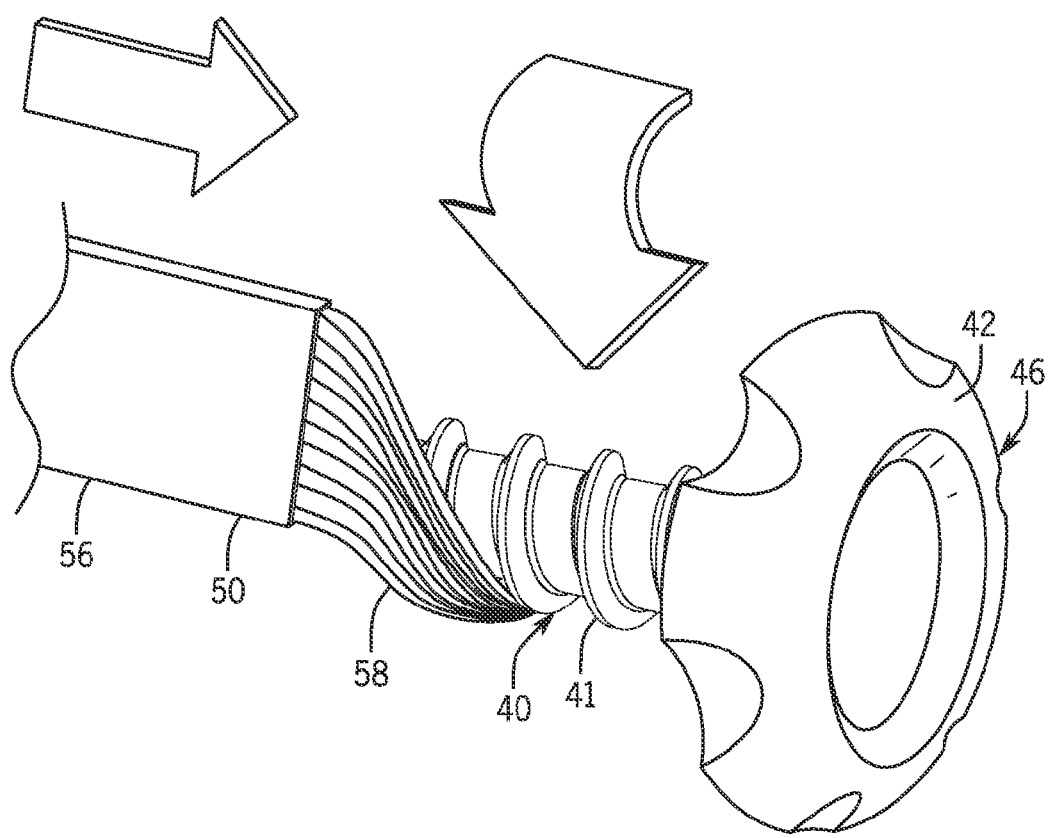
FIG. 11 is a perspective view of an adjustment mechanism that can be a part of the head rest of FIG. 3A.

The elongated members 50 and the trim 38 may be made out of a variety of materials with different properties. For example, the elongated members 50 may be elastic (or stretchable) or inelastic. The flexibility of the elongated members 50 may also help absorb some of the energy as a result of a collision or impact. The elongated members 50 may be, for example, bungee cords, material, or cloth. The elongated members 50 may optionally be padded for additional occupant comfort. Further, as shown in FIG. 11, the elongated members 50 may optionally include an outer sheath 56 and an inner flexible component 58 that may move within the sheath 56 in order to adjust the tension of the elongated member 50. The trim 38 may be any type of material, such as fabric or leather.

The elongated members 50 may allow the head rest 30 to be thinner (along, for example, the z-axis as shown in FIG. 3A), to be lighter, and to have less mass, as well as require less material or additional components. For example, although foam may be included in the head rest 30, the foam is not required within the head rest 30 (or the thickness or quantity of the foam may be reduced or lessened) due to the elongated members 50 replacing the functionality of the foam. Instead, support for the occupant head 60 may fully rely on the elongated members 50. The head rest 30 may also be self-contained with the thinner profile, according to one embodiment.

The support structure 32 and the elongated members 50) may allow the head rest 30 to have a substantially hollow interior (behind the elongated members 50) that may be at least partially enclosed. The region of the hollow interior of the head rest 30 corresponds to a region which may have been filled with foam in previous head restraints. The hollow interior further minimizes the mass and weight of the head rest 30, while the support structure 32 and the elongated members 50 still provide sufficient support for the occupant's head.

The front of the hollow region of the head rest 30 may be covered at least partially by the elongated members 50. The back, top, and the sides of the hollow region of the head rest 30 may be covered in trim 38 (as described further herein), covered (and thus supported by) a portion of the support structure 32, or may be open.

For example, according to one embodiment as shown in FIGS. 5A and 5B, the hollow interior of the head rest 30 is partially enclosed along the front and top by the elongated members 50 and along the back by the trim 38. However, it is understood that the sides may optionally be enclosed by trim 38. According to another embodiment as shown in FIG. 6, the hollow interior of the head rest 30 may be enclosed along the front by the elongated members 50 (and optionally trim 38) and along the top and sides by the side portions 36 and the top portion 37 of the support structure 32. However, it is understood that the back may optionally be enclosed by trim 38. According to another embodiment, the hollow interior may be enclosed on all sides within the head rest 30.

The Adjustment Mechanism

Figure 4A:
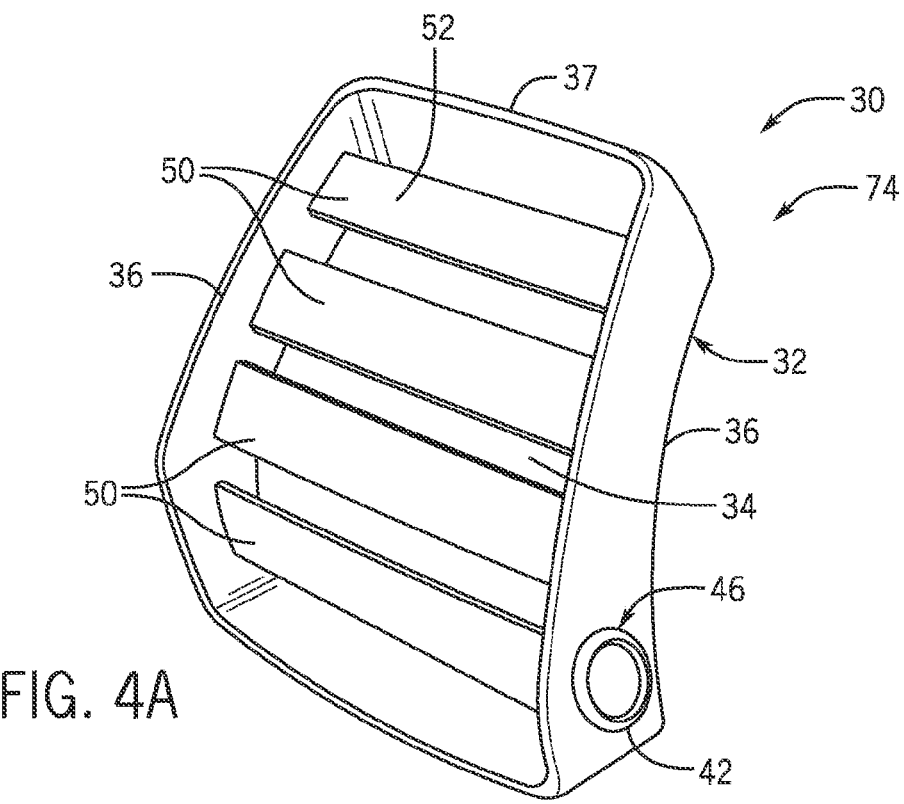
FIG. 4A is a perspective front view of the head rest of FIG. 3A in the comfort mode.
Figure 4B:
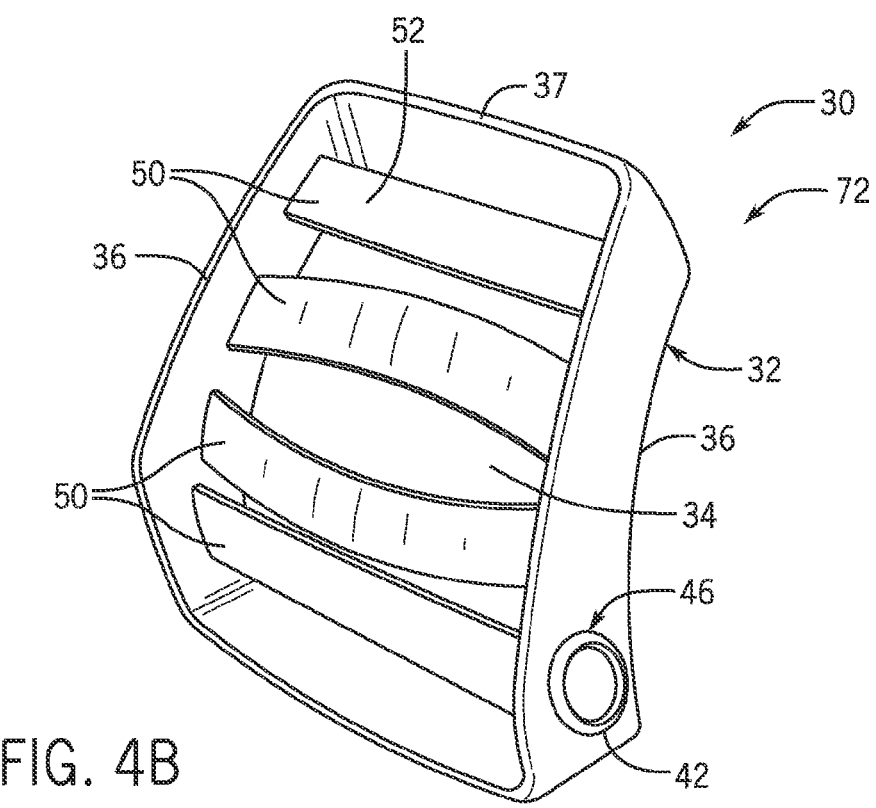
FIG. 4B is a perspective front view of the head rest of FIG. 3A in a collision mode.

The head rest 30 may further include a tensing or adjustment mechanism 40 that is configured to automatically and/or manually actuated (by the actuator 46, as described further herein) to adjust the tension of at least portion of the elongated members 50. The adjustment mechanism 40 may increase the tension of the elongated members 50 by pulling at least one side of the elongated members 50 toward the support structure 32 (e.g., toward the side portion(s) 36) such that the elongated members 50 are taut (as shown in FIG. 4A). The adjustment mechanism may decrease the tension of the elongated members 50 by releasing a portion of at least one side of the elongated members 50 such that the elongated members 50 are relatively looser (as shown in FIG. 4B). As described further herein, the adjustment mechanism 40 may be controlled differently depending on whether the head rest 30 is in the comfort mode 72 or the collision mode 74.

The adjustment mechanism 40 may utilize a variety of different mechanisms to adjust the tension of the elongated members 50 within the head rest 30. For example, the adjustment mechanism 40 may include coils, cables, motors, gears, levers, spindles, shafts, extensions, threads, and/or springs to pull the elongated members 50 to the side portions 36 (e.g. to pull the elongated members 50 taut) or to release the elongated members 50. According to various embodiments shown in FIGS. 10 and 11, the adjustment mechanism 40 may include a shaft, extension, or spindle 41 to adjust the tension of the elongated members 50. It is understood that the spindle 41 can be configured in different orientations. The embodiments shown in FIGS. 10 and 11 show the spindle 41 as substantially horizontal.

Figure 10:
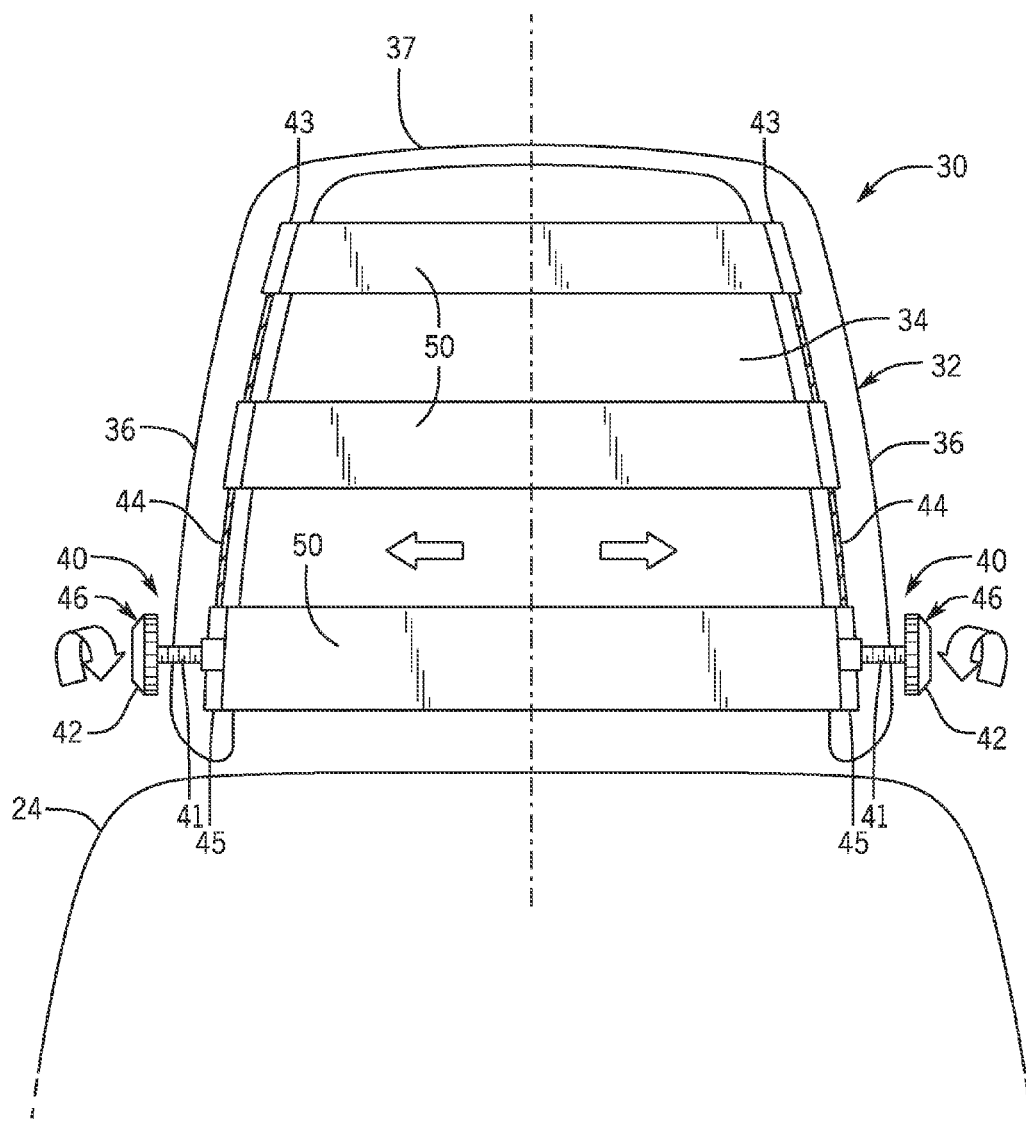
FIG. 10 is a partially cross-sectional, front view of the head rest of FIG. 3A.

Depending on which direction the adjustment mechanism 40 is moved (e.g., which direction the spindle(s) 41 are turned), the elongated members 50 may either be pulled outward (e.g. outboard) toward the sides of the support structure 32 (thus increasing the tension of the elongated members 50, as shown in FIG. 10) or the elongated members 50 may be loosened (thus decreasing the tension of the elongated members 50).

The head rest 30 may include adjustment mechanisms 40 on both sides of the support structure 32 (as shown in FIG. 10) to pull and release from both sides of the elongated members 50 (congruently at the same time or separately). Alternatively, the head rest 30 may have only one adjustment mechanism 40 on one side of the support structure 32 to pull and release one side of the elongated members 50. The adjustment mechanism 40 may be located on either side of the head rest 30.

The adjustment mechanism 40 may be in different configurations in order to allow the tension of each of the elongated members 50 to either be changed or controlled congruently or individually. For example, as shown in FIG. 10, one spindle 41 may change the tension of multiple elongated members 50 at the same time. However, as shown in FIG. 11, the spindle 41 may change the tension of an individual elongated member 50. Accordingly, the head rest 30 may include multiple spindles 41 according to which elongated members 50 are adjustable.

According to the embodiment shown in FIG. 10, the spindle 41 may be threaded or may include gears and the adjustment mechanism 40 may further include a substantially vertical extension or shaft 44 that may also be threaded or may include gears. The shaft 44 may be rotatably attached to the support structure 32 at an upper rotation point 43 and a lower rotation point 45 (and may extend between the rotation points 43 and 45), thus allowing the shaft 44 to rotate or revolve relative to the support structure 32. The threads or gears on spindle 41 may interact with the threads or gears on the shaft 44 such that rotation of the spindle 41 causes the shaft 44 to rotate, twist, or revolve. The shaft 44 may connect to one or multiple different elongated members 50 along the length of one of the side portions 36 of the support structure 32. Therefore, as the shaft 44 is rotated (due to the spindle 41 being rotated), the elongated members 50 may wrap around or unwrap from the shaft 44, thus changing the tension of the elongated members 50. For example, rotating the spindle 41 (and thus rotating the shaft 44) in a first direction may wrap multiple elongated members 50 around different portions or segments of the shaft 44 (which may congruently tighten and increase the tension of the elongated members 50) and rotating the spindle 41 (and thus rotating the shaft 44) in a second opposite direction may unwrap multiple elongated members 50 from the shaft 44 (which may congruently loosen and decrease the tension of the elongated members 50).

According to another embodiment shown in FIG. 11, at least one of the elongated members 50 may wrap directly around the spindle 41. For example, an end of the elongated member 50 may be attached or fixed to the spindle 41. Accordingly, as spindle 41 is rotated, the elongated member 50 may wrap around or unwrap from a portion or segment of the spindle 41, which may tighten or loosen, respectfully, the elongated member 50. The adjustment mechanism 40 may include multiple spindles 41 each corresponding to an individual elongated member 50 for individual adjustment (e.g., each elongated member 50 may have its own spindle 41 for adjustment).

According to one embodiment, the tension of the individual elongated members 50 may be adjusted to different amounts or degrees according to user comfort preferences (in the comfort mode 72) and to properly support or cup the head (in the comfort mode 72 and/or in the collision mode 74). For example, as shown in FIG. 4B, central elongated members 50 may be more loose while upper and lower elongated members may be relatively more tense. Or, the lower elongated members 50 may be more tense while the higher elongated members 50 may be relatively more loose.

It is also understood that the adjustment mechanism 40 may employ a variety of different mechanisms to change the tension of the elongated members 50, such as pulling or releasing the elongated members 50 and tying the elongated members 50 at the desired tension.

The Actuator

Figure 12:
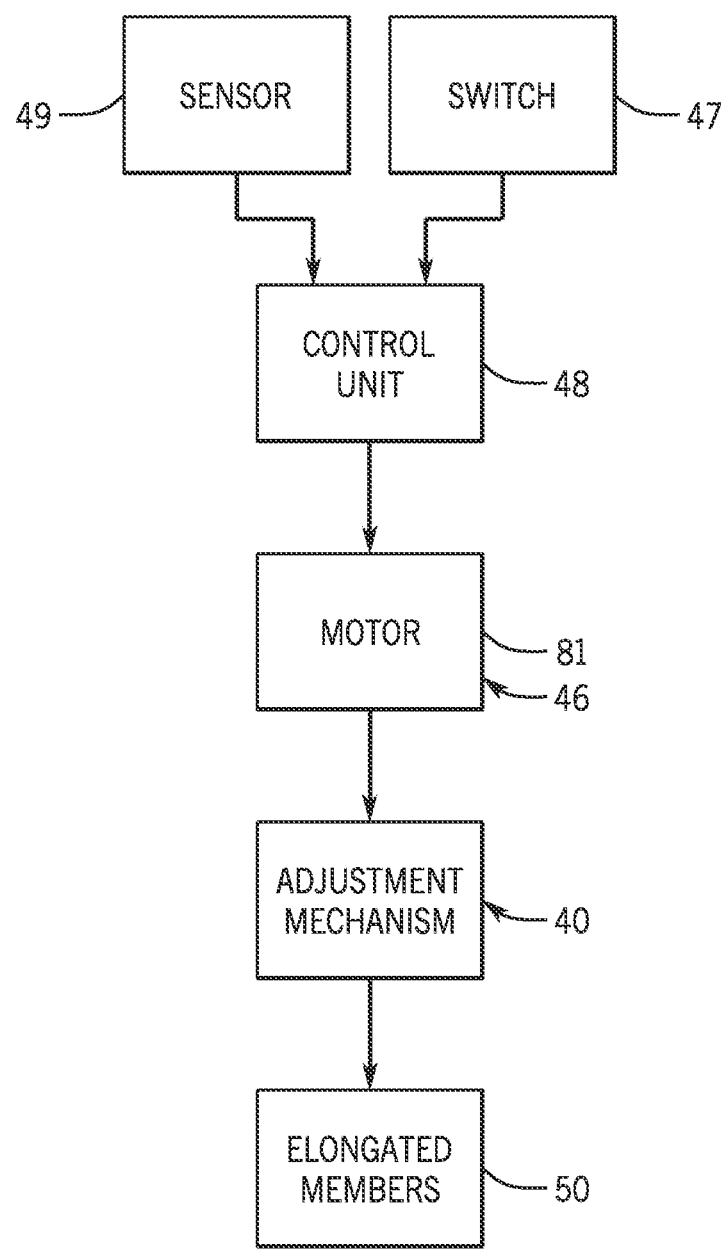
FIG. 12 is a schematic representation of a control system of a head rest according to one embodiment.

As shown in FIG. 10-12, the head rest 30 may further include an actuator 46 that may actuate the adjustment mechanism 40 in order to adjust the tension of the elongated members 50. The actuator 46 may either operate in an adjustable comfort mode 72 or may operate automatically in a collision mode 74. The actuator 46 may be located within the body of the head rest 30 or separate from the body of the head rest 30 (e.g., within a separate portion of the seat 22, such as the seat back 24 or the seat cushion 26).

The actuator 46 may be a variety of different devices or mechanisms that may electronically or manually actuate or operate the adjustment mechanism 40.

For example, as shown in FIG. 12, the actuator 46 may be a motor 81 (e.g., a small electric motor) that actuates the adjustment mechanism 40 and may be controlled and actuated by a control unit 48. The motor 81 may optionally detect a signal from the control unit 48. The motor 81 may be connected to the spindle 41 in order to rotate or spin the spindle 41 to wind or unwind the elongated members 50. In the comfort mode 72, the motor 81 may be manually and electronically controlled by the user (e.g., the user may push, press, turn, flip, touch, or move a button, control, or switch 47 to electronically activate the control unit 48 to cause the motor 81 to drive the adjustment mechanism 40 to adjust the elongated members 50) or automatically control based on, for example, a preset seat configuration (e.g., inserting a particular key into the ignition may electronically activate the control unit 48). In the collision mode 74, the motor 81 may be automatically controlled based on feedback from the vehicle 20 (e.g., a sensor 49 may activate the control unit 48 to cause the motor 81 to drive the adjustment mechanism 40).

In order to power the motor 81 to actuate, move, and control the adjustment mechanism 40 (to adjust the tension of the elongated members 50), the motor 81 may tie into or access the vehicle's power source through the seat 22. Alternatively or additionally, the head rest 30 may include an additional power source, such as a battery.

Alternatively or additionally as shown in FIGS. 10 and 11, the actuator 46 may be or include at least one turn knob 42 that the user or occupant can manually turn or rotate to actuate the adjustment mechanism 40 (e.g., to rotating the spindle 41) in the comfort mode 72. The knob 42 may be directly (or indirectly) connected to the spindle 41 in order to rotate or spin the spindle 41 to wind or unwind the elongated members 50. The head rest 30 may include knobs 42 on both sides of the support structure 32 (as shown in FIG. 10) to actuate adjustment mechanisms 40 on both sides of the head rest 30 (congruently at the same time or separately). Alternatively, the head rest 30 may have only one knob on one side of the support structure 32 to actuate the adjustment mechanism(s) 40. The knob 42 may be located on either side of the head rest 30.

The actuator 46 may cause the same adjustment mechanism 40 to adjust the tension of the elongated members 50 in the comfort mode 72 and the collision mode 74 or may cause two different adjustment mechanisms 40 to change the tension in the comfort mode 72 and the collision mode 74.

The desired tension for comfort in the comfort mode 72 may be less than the collision tension in the collision mode 74. For example, as shown in FIG. 4B, in the comfort mode 72, the tension of the elongated members 50 may be relatively looser or more compliant (compared to the collision mode 74) in order to allow the occupant to be more comfortable within the vehicle seat. As shown in FIG. 4A, in the collision mode 74, the tension of the elongated members 50 may be relatively more taut (compared to the comfort mode 72) in order to provide sufficient support to the occupant's head in the event of a vehicle collision.

The Comfort Mode

During normal use of the head rest 30, the actuator 46 may operate in a first, normal, use, or comfort mode 72 such that the tension of the elongated members 50 may be adjustable in order to provide the occupant with a comfortable or optimal head support. For example, the actuator 46 may be manually or automatically activated to control the adjustment mechanism 40 to adjust the elongated members 50 in order to create a firmer or softer feel and/or to move the occupant head further into or out of the head rest 30 for optimal comfort. Accordingly, in the comfort mode 72, the tension of the elongated members 50 may be adjusted according to occupant's desired tension for comfort. The comfort mode 72 may correspond to when the head rest 30 is being normally used. In the comfort mode 72, the actuator 46 may include or be the motor 81 that is electronically controlled and/or the knob 42 that is manually controlled.

According to one embodiment as shown in FIG. 12, the actuator 46 may be the motor 81 that is electronically activated and controlled to actuate and control the adjustment mechanism 40 to adjust the tension of the elongated members 50 in the comfort mode 72. According to one embodiment, the motor 81 may be manually and electronically controlled by the user, allowing the user to determine and obtain the desired tension of the elongated members 50. For example, the user or occupant may touch the switch 47 to electronically activate the control unit 48 to cause the actuator 46 to actuate and directly control the adjustment mechanism 40 to change the tension of the elongated members. The switch 47 may be located with the body of the head rest 30 or may be separate from the body of the head rest 30 (e.g., on the seat back 24 or the seat cushion 26).

According to another embodiment, the motor 81 may be automatically and electronically controlled based on preset tension settings according to the occupant's particular preferences, the specific occupant, or specific seat settings. For example, the desired tension of the elongated members 50 may be customized and preset to the specific preferences of different occupants (and their corresponding seating settings) in the comfort mode 72. For example, inserting a particular key into the ignition of the vehicle 20 (in which a particular seat setting corresponds to the key) or selecting a particular seating preference (which may include a corresponding height adjustment of the seat 22 and angle adjustment of the seat back 24) may electronically and automatically activate the control unit 48 to cause the motor 81 to drive the adjustment mechanism 40 to change or adjust the tension of the elongated members 50 to a particular tension.

According to yet another embodiment, the actuator 46 may be the knob 42 that is manually activated and controlled to actuate and directly control the adjustment mechanism 40 to adjust the tension of the elongated members 50 in the comfort mode 72, allowing the user to determine and obtain the desired tension of the elongated members 50. For example, the user or occupant may move or rotate the knob 42 to manually actuate and directly control the adjustment mechanism 40 to adjust the tension of the elongated members according to the desired tension. The amount that the knob 42 is moved may be directly correlated to the amount that the tension of the elongated members 50 is adjusted. The knob 42 may be located with the body of the head rest 30 or may be separate from the body of the head rest 30 (e.g., on the seat back 24 or the seat cushion 26). Since the user may manually move the knob 42 to loosen or tighten the elongated members 50, a power source may not be required in the comfort mode 72 to adjust the tension of the elongated members 50.

The elongated members 50 may further improve occupant comfort in the comfort mode 72 since the required tension and support of the head rest 30 in the comfort mode 72 may be different than the support required in the collision mode 74 (e.g. the head rest 30 may have a softer feel in the comfort mode 72 and the tension may be adjustable).

The Collision Mode

In the event of an vehicle accident, crash, or collision, the actuator 46 may be automatically operated in an accident, crash, or collision mode 74 such that the tension of the elongated members 50 may be automatically adjusted to provide proper support for the head 60 of the occupant. For example, as shown in FIG. 12, when impact or a vehicle accident, crash, or collision is detected by a sensor 49, the sensor 49 may automatically send a signal to the control unit 48 to automatically cause or actuate the actuator 46 (which may be the motor 81) to drive adjustment mechanism 40 to change or adjust the tension of the elongated members 50 to a particular or preset collision tension.

Depending on the previous tension of the elongated members 50 (in the comfort mode 72), the control unit 48 may cause the actuator 46 may automatically drive the adjustment mechanism 40 to either increase or decrease the tension of the elongated members 50 in order to change the surface and the provided support of the head rest 30. If the tension of the elongated members 50 in the comfort mode 72 is relatively loose when a collision is detected, the actuator 46 may automatically activate the adjustment mechanism 40 to tense the elongated members 50, thus causing the elongated members 50 to become relatively more rigid or stiff to prevent the head 60 of the occupant from moving too far into the head rest 30.

The collision tension of the elongated members 50 in the collision mode 74 (and thus how far the elongated members 50 may allow the occupant's head 60 to move into the head rest during a crash) may vary in order to comply with the local government regulations or safety requirements for head rests (such as, for example, the Federal Motor Vehicle Safety Standard 202). The collision tension of the elongated members 50 may provide the optimum whiplash compliant configuration within the head rest 30 to protect the occupant and prevent injury.

The tension of the elongated members 50 may be measured or detected by a strain gauge (which may send a signal to the control unit 48) to ensure adequate support during a collision. Alternatively or additionally, the tension of the elongated members 50 may be pre-measured and directly correlated to the degree of movement of the adjustment mechanism 40.

The specific collision tension of the elongated members 50 may further depend on other aspects of the seat 22, such as the relative angle or position of the seat back 24 to the cushion 26. The control unit 48 may be configured to determine the optimal collision tension based at least in order on a relative angle of the seat back 24 to the seat cushion 26 and may control the actuator 46 accordingly.

The sensors 49 or the control unit 48 may access information from current sensors in other areas or locations within the vehicle 20. The sensors 49 may be located in, for example, the seat back 24 or the seat cushion 26.

After the collision, the control unit 48 may be configured to cause the actuator 46 to automatically move or return back to the comfort mode 72 (which may be a default mode) from the collision mode 74 after the collision is completed, thus causing the actuator to drive the adjustment mechanism 40 to move, revert, or adjust the elongated members 50 back into the desired or previous tension for comfort.

Even with the thinner profile and the improved occupant comfort of the head rest 30, the head rest 30 may still maintain or meet the required head rest safety requirements and provide a whiplash compliant position in the collision mode 74. Although adjustability of the elongated members 50 may be particularly beneficial in the event of a rear-end collision to prevent whiplash, it is understood that the elongated members 50 may also be adjusted to provide proper support in the event of other types of collisions.

Airflow within the Head Rest

According to another embodiment and due to the thin profile of the head rest 30 and the additional available space within the vehicle 20 and head rest 30, additional mechanisms or technologies may be integrated into the head rest 30. This may increase, for example, the occupant comfort and/or convenience. According to one embodiment, the head rest 30 may include an airflow option, as shown in FIG. 6. The airflow 62 may be provided along any portion of the head rest 30 to cool or warm the occupant head 60.

The support structure 32, the elongated members 50, and the trim 38 may be configured to allow the airflow 62 to move or permeate at least partially through to the head 60 of the occupant. For example, air may flow from the opening 34 of the support structure 32 to the back sides 54 of the elongated members 50, from the back sides 54 to the front sides 52 of the elongated members 50, and thus to the back of the head 60 of the occupant.

The airflow 62 may be provided by an active airflow system and may tie into the air system within the vehicle 20. For example, a fan or vent 64 may be integrated into the seat back 24 and air may be directed out of a top opening of the seat back 24 and into the head rest 30. Alternatively or additionally, the fan or vent 64 may be integrated into a rear side of the head rest 30 and may direct air toward the front side of the head rest 30 (through the head rest 30).

Alternatively or additionally, the airflow 62 through the head rest 30 may be passive. For example, the head rest 30 may allow ambient air to move passively through the head rest 30.

Lighting Device

Figure 7:
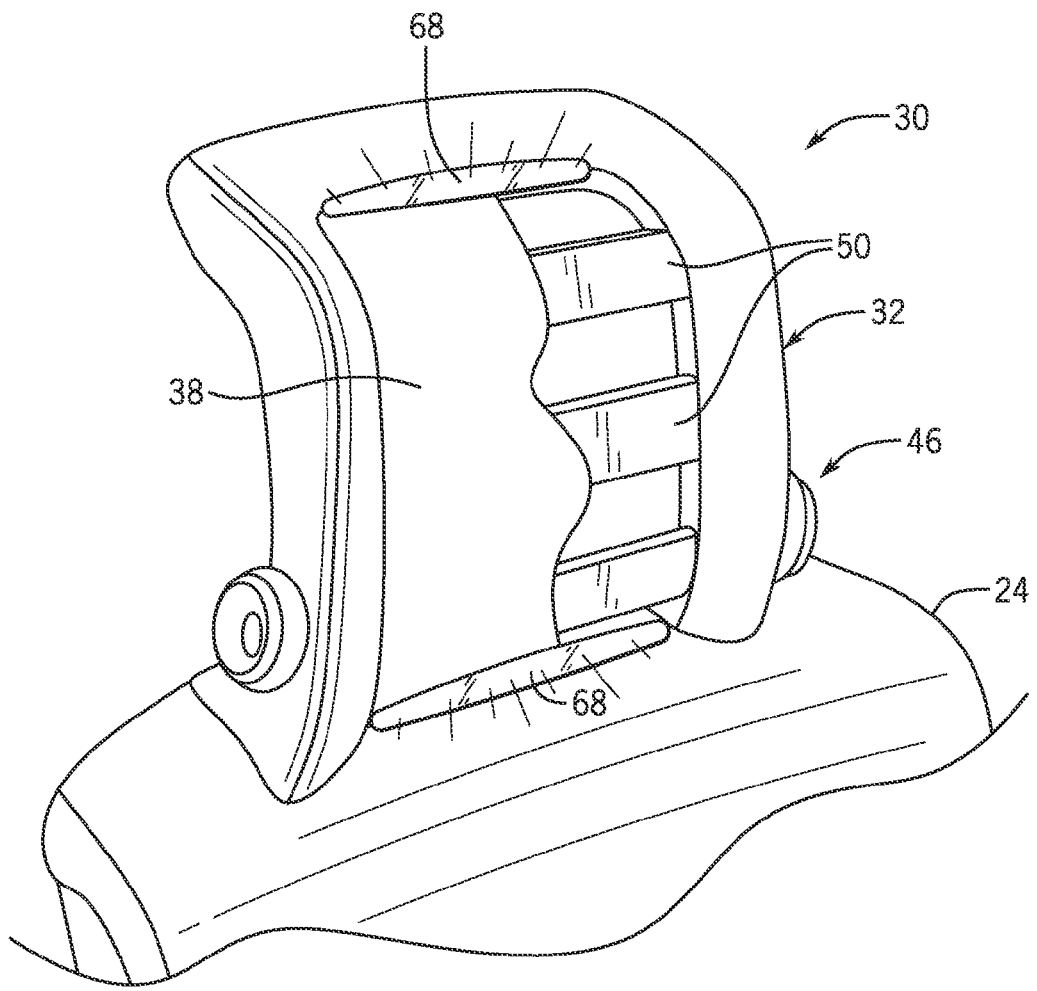
FIG. 7 is a perspective, partially cut-away, front view of a vehicle seat with a head rest according to yet another embodiment.

According to another embodiment as shown in FIG. 7, the head rest 30 may alternatively or additionally include or integrate at least one lighting device 68 within and/or on the head rest 30. The lighting device 68 may inexpensively improve the ambiance and atmosphere of the inside of the vehicle 20, increase the available interior lighting, and/or make the head rest 30 look even thinner and lighter than the head rest 30 actually is.

For example, the head rest 30 may include a lighting device 68 attached to portions of the head rest 30, such as the top, sides, bottom, and/or back of the the support structure 32. The lighting device 68 may be, for example, LEDs (such as LED light tubes). The head rest lights may be manually or automatically switched on and off by the user and/or with other lighting within the vehicle 20.

Alternatively or additionally, the lighting device 68 may be function as indictors to indicate the status or position of the head rest 30. For example, the status of the head rest 30 may be indicated by a certain color of lighting device 68, whether or not the lighting device 68 is on, and/or if the lighting device 68 is flashing. The status of the head rest 30 may include whether or not the elongated members 50 are engaged, if the head rest 30 needs to be reset or repositioned, or which mode the actuator 46 is currently in (e.g. the comfort mode 72 or the collision mode 74).

The embodiments disclosed herein provide a head restraint with minimal packaging that may automatically adjust in the event of a collision to provide proper support to the head of the occupant. Besides those embodiments depicted in the figures and described in the above description, other embodiments of the present invention are also contemplated. For example, any single feature of one embodiment of the present invention may be used in any other embodiment of the present invention.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. A head restraint comprising:
   a support structure with an opening;
   adjustable flexible elongated members attached to the support structure, spanning the opening in the support structure, and configured to support a user's head in at least an adjustable comfort mode;
   an adjustment mechanism configured to at least one of automatically or manually adjust tension of at least portions of the elongated members spanning the opening; and
   an actuator that actuates the adjustment mechanism to adjust the tension of the elongated members,
   wherein the actuator operates in the comfort mode to cause the adjustment mechanism to adjust the tension of the elongated members according to a desired tension for comfort, wherein the comfort mode corresponds to normal use of the head restraint.

2. The head restraint of claim 1, further comprising at least one lighting device attached to the support structure.

3. The head restraint of claim 1, wherein the elongated members are configured to support a back portion of the user's head.

4. The head restraint of claim 1, wherein the actuator is configured to be manually activated to adjust the tension of the elongated members in the comfort mode.

5. The head restraint of claim 1, wherein the actuator is configured to be electronically activated to adjust the tension of the elongated members in the comfort mode.

6. The head restraint of claim 1, wherein the actuator operates automatically in a collision mode to cause the adjustment mechanism to change the tension of the elongated members to a collision tension when a collision is detected.

7. The head restraint of claim 1, wherein air can flow from the opening to back sides of the elongated members and from the back sides of the elongated members to front sides of the elongated members, wherein the air is at least one of ambient air or air from an active airflow system.

8. The head restraint of claim 1,
   wherein the actuator operates automatically in a collision mode to cause the adjustment mechanism to change the tension of the elongated members to a collision tension when a collision is detected.

9. The head restraint of claim 8, wherein the desired tension for comfort in the comfort mode is less than the collision tension in the collision mode.

10. The head restraint of claim 8, wherein the actuator is configured to return to the comfort mode from the collision mode after the collision is completed.

11. The head restraint of claim 1, wherein the adjustment mechanism increases the tension of the elongated members by pulling at least one side of the elongated members toward the support structure and decreases the tension of the elongated members by releasing a portion of at least one side of the elongated members.

12. The head restraint of claim 1, wherein the elongated members attach to and extend between two substantially vertical and opposing side portions of the support structure, wherein the elongated members are substantially horizontal.

13. The head restraint of claim 1, further comprising trim extending along a front side of the elongated members, wherein the trim is attached to the support structure.

14. A head restraint comprising:
   a support structure with an opening;
   adjustable flexible elongated members attached to the support structure, spanning the opening in the support structure, and configured to support a user's head;
   an adjustment mechanism configured to at least one of automatically or manually adjust tension of at least portions of the elongated members spanning the opening; and
   an actuator that actuates the adjustment mechanism to adjust the tension of the elongated members, wherein the actuator operates automatically in a collision mode to cause the adjustment mechanism to change the tension of the elongated members to a collision tension when a collision is detected, wherein the actuator is actuated by a control unit that is configured to determine the collision tension based at least in part on a relative angle of a seat back to a seat cushion.

* * * * *